(12) United States Patent
Neiger et al.

(10) Patent No.: US 12,379,956 B2
(45) Date of Patent: Aug. 5, 2025

(54) PROCESSOR INTERRUPT EXPANSION FEATURE

(71) Applicant: Intel Corporation, Santa Clara, CA (US)

(72) Inventors: Gilbert Neiger, Portland, OR (US); Rajesh Sankaran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 759 days.

(21) Appl. No.: 17/521,518

(22) Filed: Nov. 8, 2021

(65) Prior Publication Data
US 2023/0142399 A1    May 11, 2023

(51) Int. Cl.
*G06F 9/48* (2006.01)
*G06F 9/32* (2018.01)
*G06F 9/46* (2006.01)
*G06F 13/24* (2006.01)

(52) U.S. Cl.
CPC ............ *G06F 9/4812* (2013.01); *G06F 9/327* (2013.01); *G06F 9/461* (2013.01); *G06F 13/24* (2013.01)

(58) Field of Classification Search
CPC ........ G06F 9/4812; G06F 9/327; G06F 9/461; G06F 13/24
See application file for complete search history.

(56) References Cited

U.S. PATENT DOCUMENTS

| 10,664,425 | B2 * | 5/2020 | Malalangaradhos ... G06F 13/26 |
| 2014/0351472 | A1 * | 11/2014 | Jebson .................... G06F 13/24 710/269 |
| 2016/0147679 | A1 * | 5/2016 | Guddeti ................ G06F 9/4812 710/269 |
| 2018/0081835 | A1 * | 3/2018 | Zou ....................... G06F 12/1027 |
| 2019/0121658 | A1 * | 4/2019 | Thiyagarajah .......... G06F 9/546 |

FOREIGN PATENT DOCUMENTS

WO    2017135950    8/2017

OTHER PUBLICATIONS

Extended European Search Report from European Patent Application No. 22200239.6 notified Feb. 27, 2023, 8 pgs.

* cited by examiner

*Primary Examiner* — Glenn A. Auve
(74) *Attorney, Agent, or Firm* — Essential Patents Group, LLP

(57) ABSTRACT

An embodiment of an integrated circuit may comprise a processor with one or more cores and circuitry coupled to the one or more cores, the circuitry to control one or more interrupts based on an interrupt expansion data structure, and report information derived from the interrupt expansion data structure to a software interrupt handler. Other embodiments are disclosed and claimed.

15 Claims, 14 Drawing Sheets

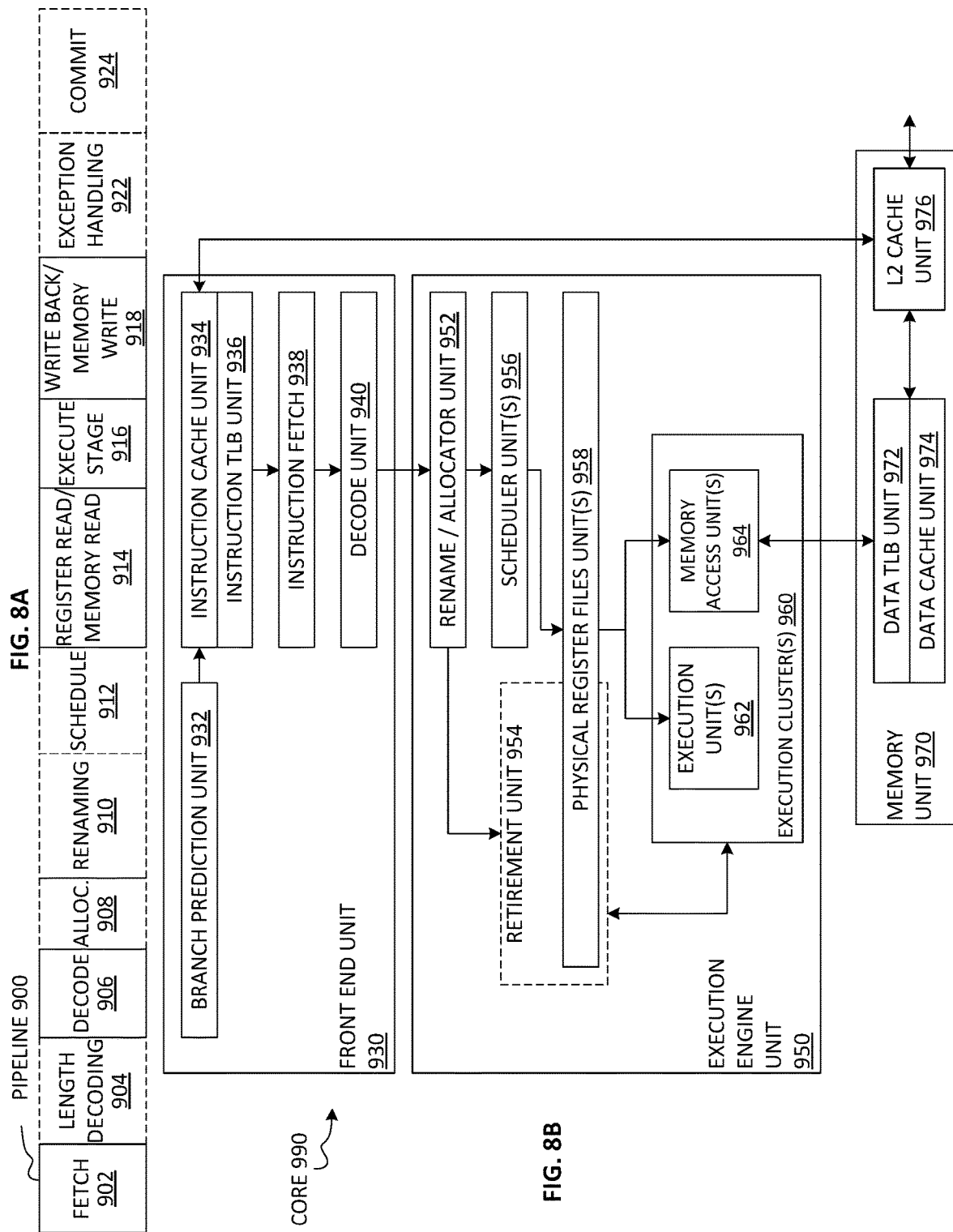

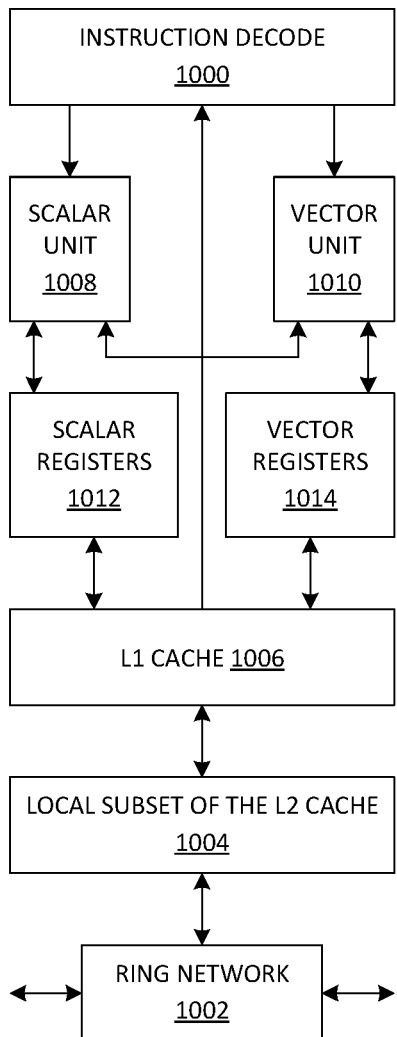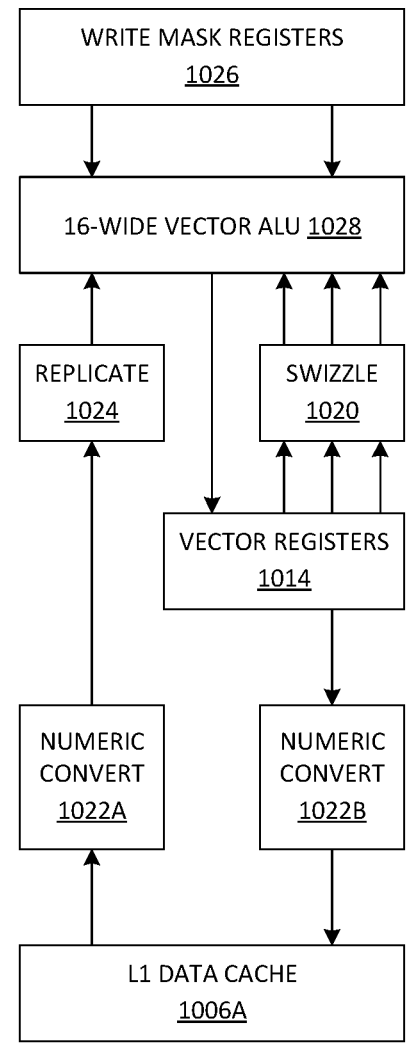
FIG. 9A
FIG. 9B

PROCESSOR INTERRUPT EXPANSION FEATURE

BACKGROUND

1. Technical Field

This disclosure generally relates to processor technology.

2. Background Art

An event that needs attention from software may be signaled to a processor as an interrupt. The interrupt alerts the processor and serves as a request for the processor to suspend its current activities, so that the event can be processed in a timely manner. When the request is serviced, the processor suspends its current activities, saving its state as needed, and executes an interrupt handler to service the interrupt. Various input/output (IO) and other hardware devices may use interrupts to indicate events that require attention. Real-time computing systems may utilize interrupts to implement application multi-tasking. In addition, multi-threaded software may use inter-processor interrupts for coordination and synchronization. Some multi-processor systems may utilize an interrupt controller such as an INTEL Programmable Interrupt Controller (PIC), an INTEL Advanced Programmable Interrupt Controller (APIC), etc. An interrupt controller may be a discrete component, or portions of the interrupt controller may be integrated with the processor.

BRIEF DESCRIPTION OF THE DRAWINGS

The various embodiments of the present invention are illustrated by way of example, and not by way of limitation, in the figures of the accompanying drawings and in which:

FIG. 8A is a block diagram illustrating both an exemplary in-order pipeline and an exemplary register renaming, out-of-order issue/execution pipeline according to embodiments of the invention;

FIG. 8B is a block diagram illustrating both an exemplary embodiment of an in-order architecture core and an exemplary register renaming, out-of-order issue/execution architecture core to be included in a processor according to embodiments of the invention;

FIGS. 9A-B illustrate a block diagram of a more specific exemplary in-order core architecture, which core would be one of several logic blocks (including other cores of the same type and/or different types) in a chip;

DETAILED DESCRIPTION

Figure 1:
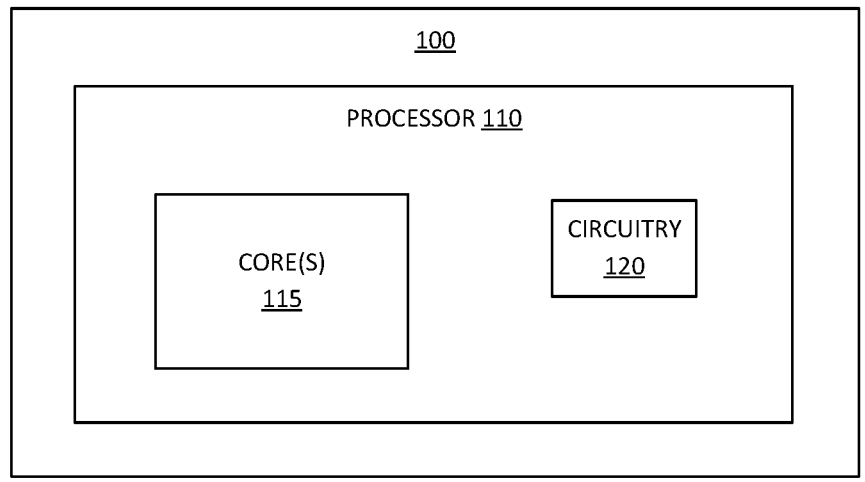
FIG. 1 is a block diagram of an example of an integrated circuit according to an embodiment.

Embodiments discussed herein variously provide techniques and mechanisms for a processor with an interrupt expansion feature. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to control one or more interrupts within a processor based on an interrupt expansion feature.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—e.g. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Some embodiments provide technology for using in-memory data structures to increase the number of distinguishable interrupts. When a platform delivers an interrupt to system software, the interrupt is typically identified to software by a number, sometimes referred to as an interrupt vector. In a conventional platform, the number of interrupt vectors is bounded as a specification of the platform. For example, if hardware identifies interrupts with an 8-bit vector, software can distinguish no more than 256 interrupts (with vectors 0-255) based on the interrupt vector. The relatively small number of interrupt vectors may be a problem for some platforms. If a platform defines more than 256 sources of interrupts that may be delivered to a single processor, for example, some of those interrupt sources will need to share the same interrupt vector, preventing software from identifying an interrupt source solely based on the interrupt vector.

System software may be able distinguish interrupt sources that share a vector by interacting with the interrupt sources (e.g., by interrogating the platform input/output (IO) devices that can produce interrupts with that vector). Alternatively, an operating system (OS) may address the problem by configuring each interrupt source to target only a single processor, implying that different interrupt sources may share an interrupt vector but will necessarily be delivered to different processors. Each receiving processor will then map such a vector to different interrupt sources. Interrogating IO devices to distinguish the source of an interrupt, however, may add considerable latency and complexity to interrupt handling, especially if many sources (all of which must be checked) share a vector. Configuring each interrupt source to target only a single processor prevents symmetric interrupt handling (as noted above, processors cannot all identify interrupt sources in the same way) and reduces software flexibility. Some embodiments provide technology to overcome one or more of the foregoing problems.

In some embodiments, a processor may support an interrupt expansion feature to report data from in-memory data structures. For example, hardware interrupts may be posted into a data structure (e.g., a posted-interrupt data structure) such as a bitmap (e.g., with one bit per interrupt source). The bitmap may be contained in a posted-interrupt descriptor (PID). Embodiments of a processor include technology to report data from such a bitmap to the system software's interrupt handler, effectively multiplying the number of distinguishable interrupt sources by the size of the bitmap. Advantageously, a suitably configured platform may handle interrupts from many more sources (e.g., 64 times more, 256 times more, etc.) without the software complexities of sharing interrupt vectors between interrupt sources or of asymmetric interrupt handling.

With reference to FIG. 1, an embodiment of an integrated circuit 100 may include a processor 110 with one or more cores 115 and circuitry 120 coupled to the one or more cores 115. The circuitry 120 may be configured to control one or more interrupts based on an interrupt expansion data structure, and report information derived from the interrupt expansion data structure to a software interrupt handler. In some embodiments, the circuitry 120 may be configured to deliver an interrupt to the software interrupt handler based on an interrupt vector associated with the interrupt and information derived from the interrupt expansion data structure. For example, the circuitry 120 may be configured to determine if the interrupt vector associated with the interrupt corresponds to an entry in the interrupt expansion data structure that is valid and, if so determined, to deliver the interrupt to the software interrupt handler together with additional information derived from a posted-interrupt data structure indicated by the entry that corresponds to the interrupt vector.

In some embodiments, the circuitry 120 may be configured to save a content of the additional information, clear the additional information from the posted-interrupt data structure, and report the interrupt vector to the software interrupt handler together with the saved content of the additional information, where the additional information indicates one or more delivered interrupts associated with the interrupt vector. For example, the interrupt vector may correspond to a class of interrupts and the additional information may correspond to a bitmap of multiple interrupts within the class of interrupts.

In some embodiments, the circuitry 120 may be alternatively configured to save an index to a field of the entry in the posted-interrupt data structure as the additional information, clear the field of the entry in the posted-interrupt data structure, and report the interrupt vector to the software interrupt handler together with the saved index, where the index indicates a particular interrupt associated with the interrupt vector. In this example, the interrupt vector may correspond to a class of interrupts and the index may correspond to the particular interrupt within the class of interrupts.

Figure 10:
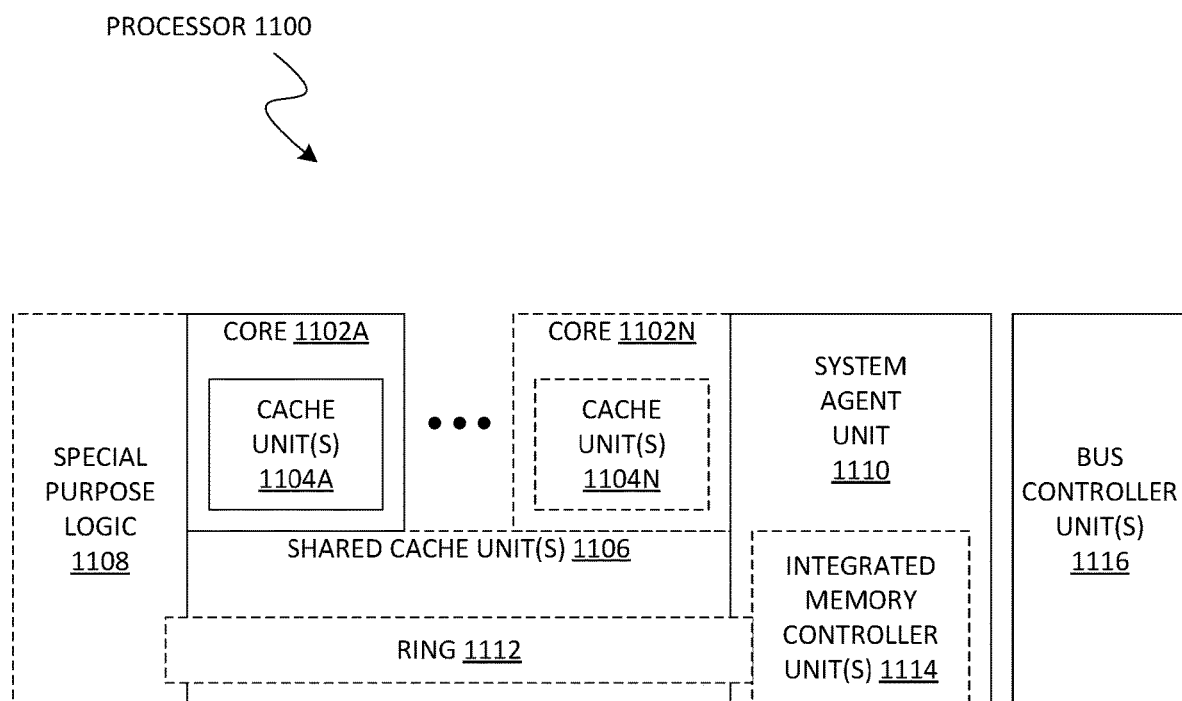
FIG. 10 is a block diagram of a processor that may have more than one core, may have an integrated memory controller, and may have integrated graphics according to embodiments of the invention.
Figure 13:
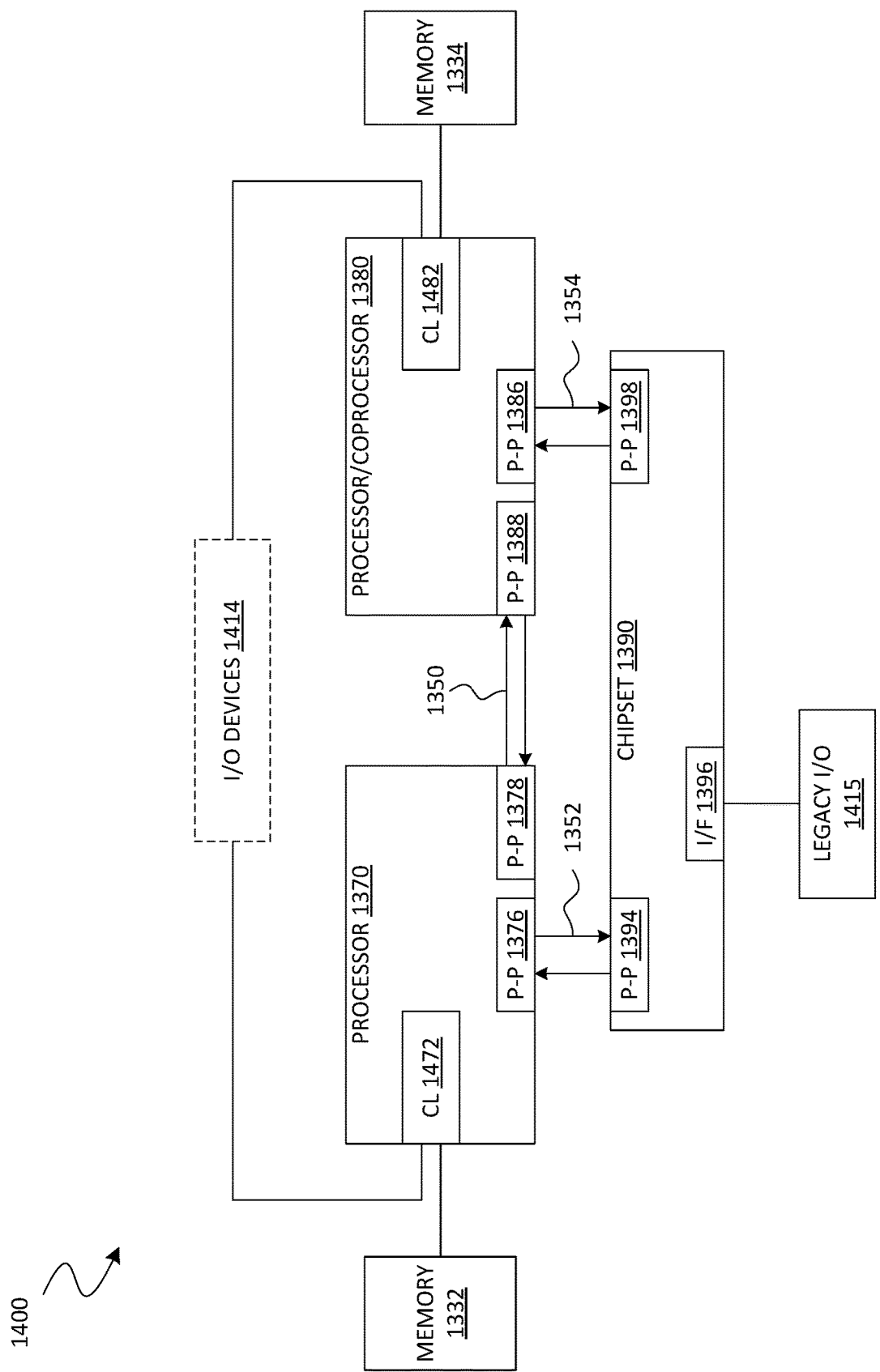
Figure 14:
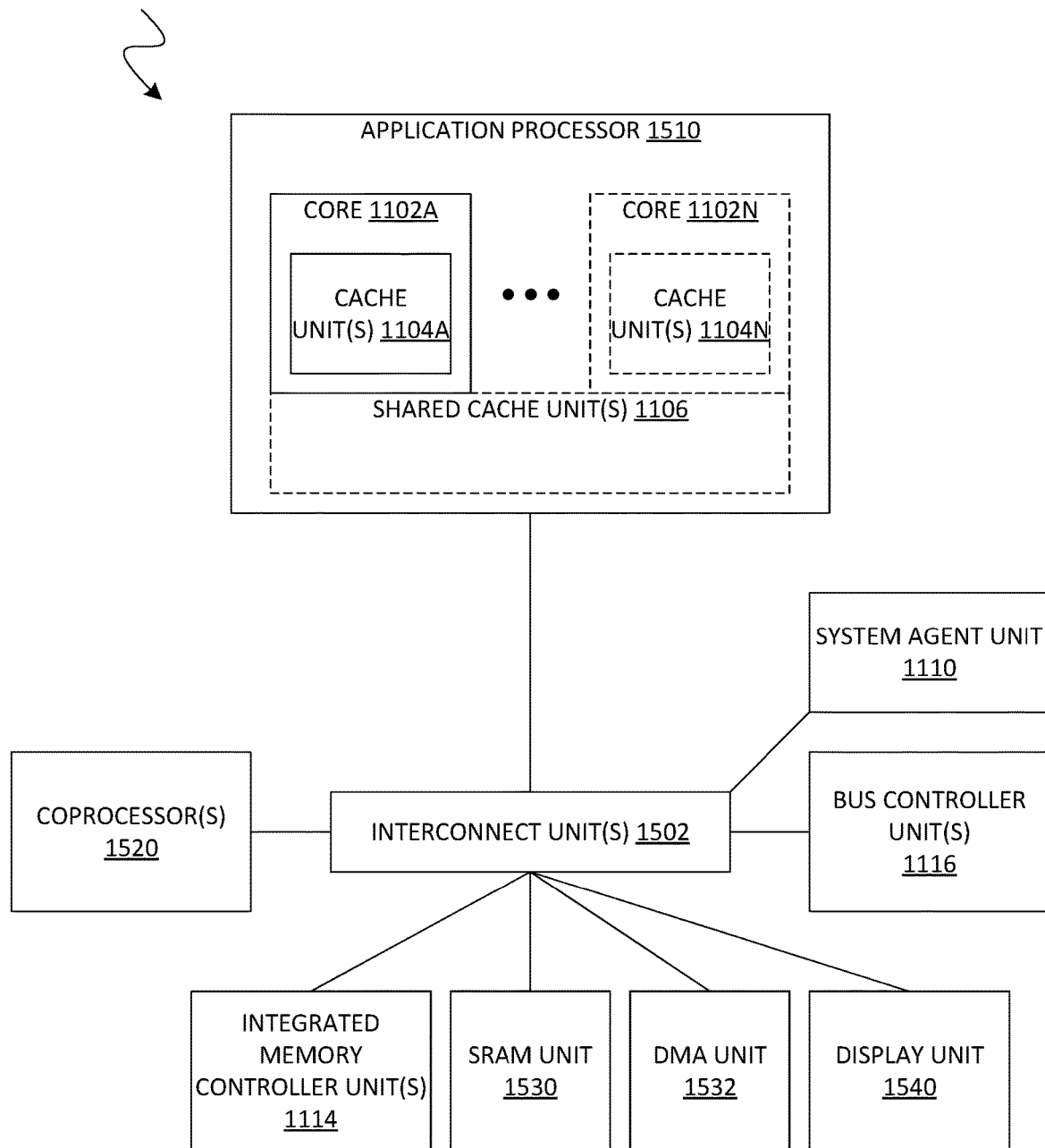
Figure 15:
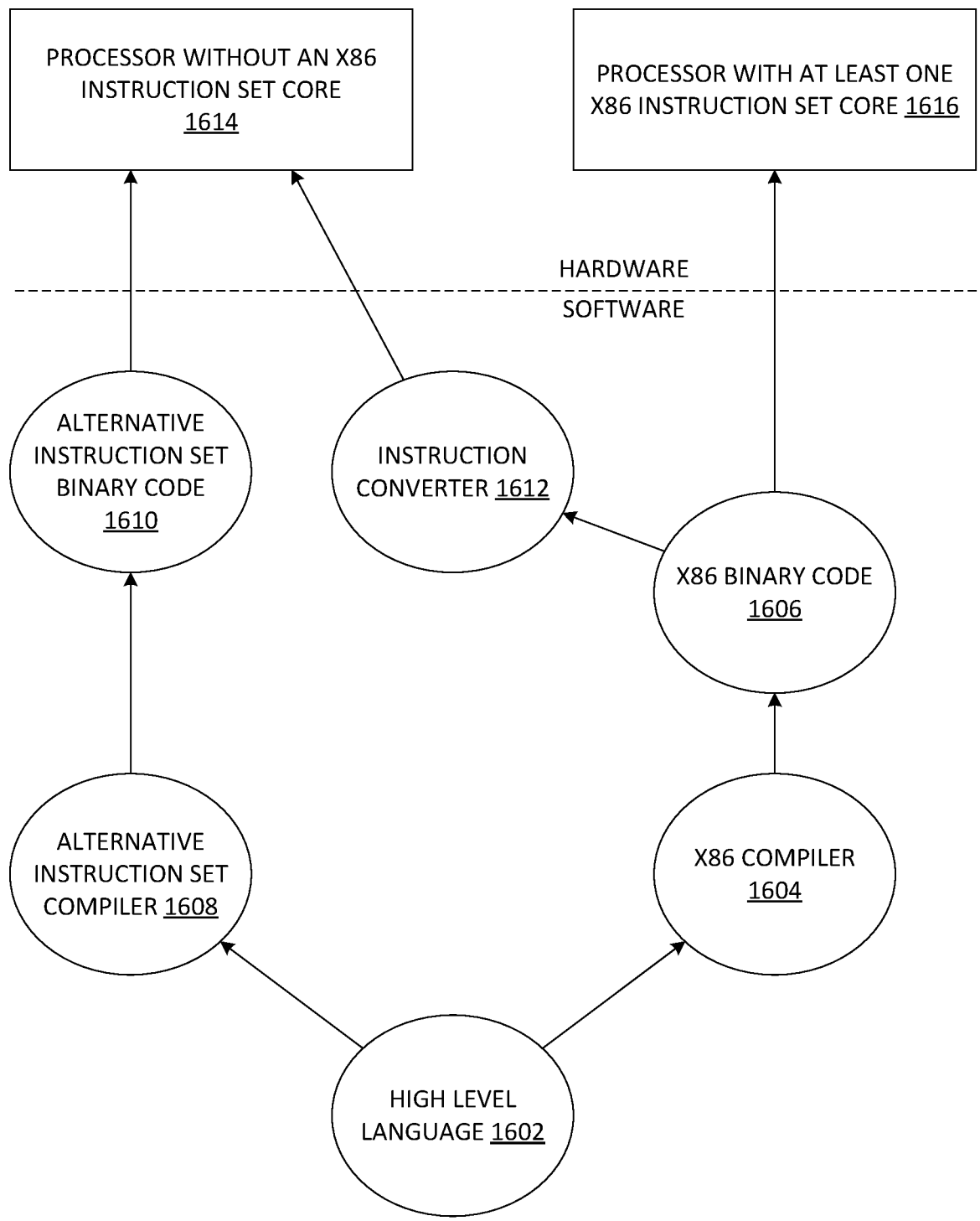
FIG. 15 is a block diagram contrasting the use of a software instruction converter to convert binary instructions in a source instruction set to binary instructions in a target instruction set according to embodiments of the invention.

Embodiments of the circuitry 120 may be integrated with any suitable core such as those described herein including, for example, the core 990 (FIG. 8B) and/or the cores 1102A-N (FIGS. 10, 14). Embodiments of the circuitry 120 may be incorporated in a processor such as those described herein including, for example, the processor 1100 (FIG. 10), the processor 1210 (FIG. 11), the co-processor 1245 (FIG. 11), the processor 1370 (FIGS. 12-13), the processor/coprocessor 1380 (FIGS. 12-13), the coprocessor 1338 (FIGS. 12-13), the application processor 1510 (FIG. 14), the coprocessor 1520 (FIG. 14), and/or the processors 1614, 1616 (FIG. 15). In some embodiments, the circuitry 120 may include the core's circuitry that executes microcode to implement the functions of the circuitry 120.

Figure 2:
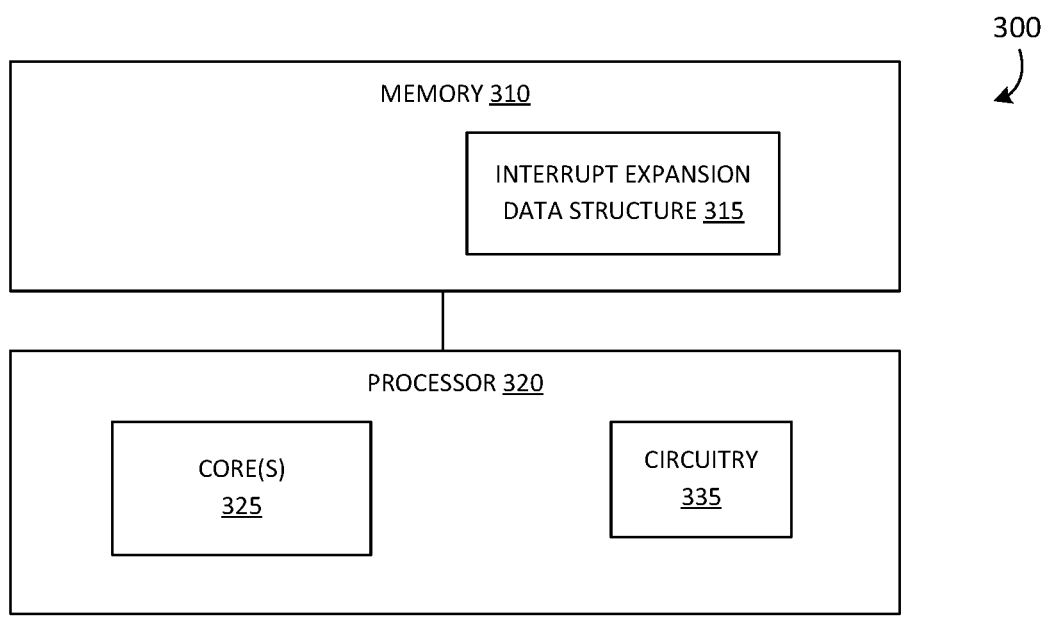
FIG. 2 is a block diagram of an example of an apparatus according to an embodiment.

With reference to FIG. 2, an embodiment of an apparatus 300 may include memory 310 to store an interrupt expansion data structure 315, and a processor 320 coupled to the memory 310. The processor 320 may include one or more cores 325 and circuitry 335 coupled to the one or more cores 325 to control one or more interrupts based on the interrupt expansion data structure 315, and report information derived from the interrupt expansion data structure 315 to a software interrupt handler. In some embodiments, the circuitry 335 may be configured to deliver an interrupt to the software interrupt handler based on an interrupt vector associated with the interrupt and information derived from the interrupt expansion data structure 315. For example, the circuitry 335 may be configured to determine if the interrupt vector associated with the interrupt corresponds to an entry in the interrupt expansion data structure 315 that is valid and, if so determined, to deliver the interrupt to the software interrupt handler together with additional information derived from a posted-interrupt data structure indicated by the entry in the interrupt expansion data structure 315 that corresponds to the interrupt vector.

In some embodiments, the circuitry 335 may be configured to save a content of the additional information, clear the additional information from the posted-interrupt data structure, and report the interrupt vector to the software interrupt handler together with the saved content of the additional information, where the additional information indicates one or more delivered interrupts associated with the interrupt vector. For example, the interrupt vector may correspond to a class of interrupts and the additional information may correspond to a bitmap of multiple interrupts within the class of interrupts.

In some embodiments, the circuitry 335 may be alternatively configured to save an index to a field of the entry in the posted-interrupt data structure as the additional information, clear the field of the entry in the posted-interrupt data structure, and report the interrupt vector to the software interrupt handler together with the saved index, where the index indicates a particular interrupt associated with the interrupt vector. In this example, the interrupt vector may correspond to a class of interrupts and the index may correspond to the particular interrupt within the class of interrupts.

Embodiments of the circuitry 335 may be integrated with any suitable core such as those described herein including, for example, the core 990 (FIG. 8B) and/or the cores 1102A-N (FIGS. 10, 14). Embodiments of the circuitry 335 may be incorporated in a processor such as those described herein including, for example, the processor 1100 (FIG. 10), the processor 1210 (FIG. 11), the co-processor 1245 (FIG. 11), the processor 1370 (FIGS. 12-13), the processor/coprocessor 1380 (FIGS. 12-13), the coprocessor 1338 (FIGS. 12-13), the application processor 1510 (FIG. 14), the coprocessor 1520 (FIG. 14), and/or the processors 1614, 1616 (FIG. 15). In some embodiments, the circuitry 335 may include the core's circuitry that executes microcode to implement the functions of the circuitry 335.

Embodiments may utilize any suitable techniques and/or data structures to implement the processor interrupt expansion technology. One example of such a technique is the posted-interrupt technology utilized by an IO memory management unit (IOMMU). An IOMMU may control some number of interrupts sources. The IOMMU may configure any such interrupt source for interrupt posting. If a source is configured for interrupt posting, the IOMMU may associate that source with a posted-interrupt descriptor (PID) and an interrupt index. The PID may correspond to a data structure in memory, containing a bitmap and information about a notification interrupt (e.g., an interrupt vector and a target processor). The interrupt index may correspond to a number that selects a bit in the PID's bitmap. When the IOMMU receives an interrupt from a source configured for interrupt posting, the IOMMU may first set the bit in the associated PID's bitmap corresponding to the source's interrupt index. Then, the IOMMU may consult the PID's notification-interrupt information and send the specified interrupt if needed. One example of a PID may be defined for virtual interrupts and includes a bitmap of 256 bits. Another example of a PID may be defined for user interrupts (e.g., a "UPID") and includes a bitmap of 64 bits.

Figure 3:
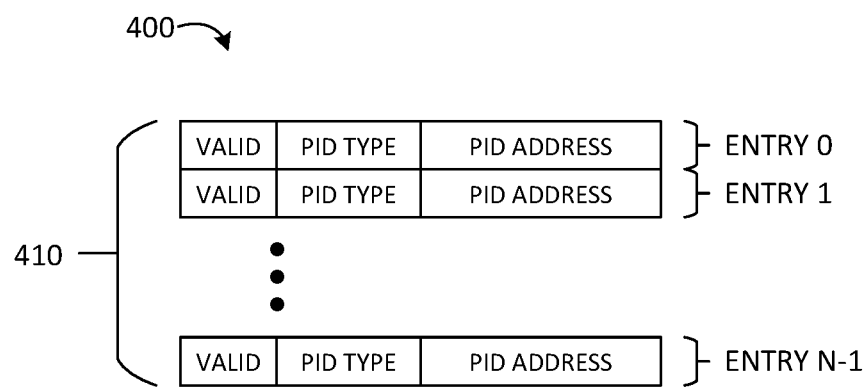
FIG. 3 is an illustrative diagram of an interrupt expansion data structure according to an embodiment.

With reference to FIG. 3, an embodiment of an interrupt expansion data structure 400 may include a table 410 of entries (e.g., entry 0 through entry N-1, where N is the number of interrupt vectors). The table 410 may be indexed by an interrupt vector and each entry may include a plurality of fields associated with the interrupt vector. In some embodiments, system software (e.g., an OS) may associate each interrupt vector with a PID. For example, the table 410 may be stored in memory to maintain a suitable association. Each table entry may contain a valid field (e.g., a one bit field) that indicates that interrupts with that vector should be treated as notification interrupts associated with a PID. A valid table entry may also contain the address of the PID. The table entry may also include a field that indicates which type of PID is referenced (e.g., a virtual interrupt PID, a UPID, etc.). In some embodiments, the OS may associate each interrupt vector with a PID on each processor. For example, for every vector, there may be a set of PIDs, one for each processor (e.g., where each PID includes an identification of its target processor). Each vector may then have a separate PID for each possible target processor. In this example, the table 410 may be set up by the OS for one table one per processor. In the table for processor P, the addresses are all for PIDs in which the target processor was P (e.g., and not some other processor).

Figure 4:
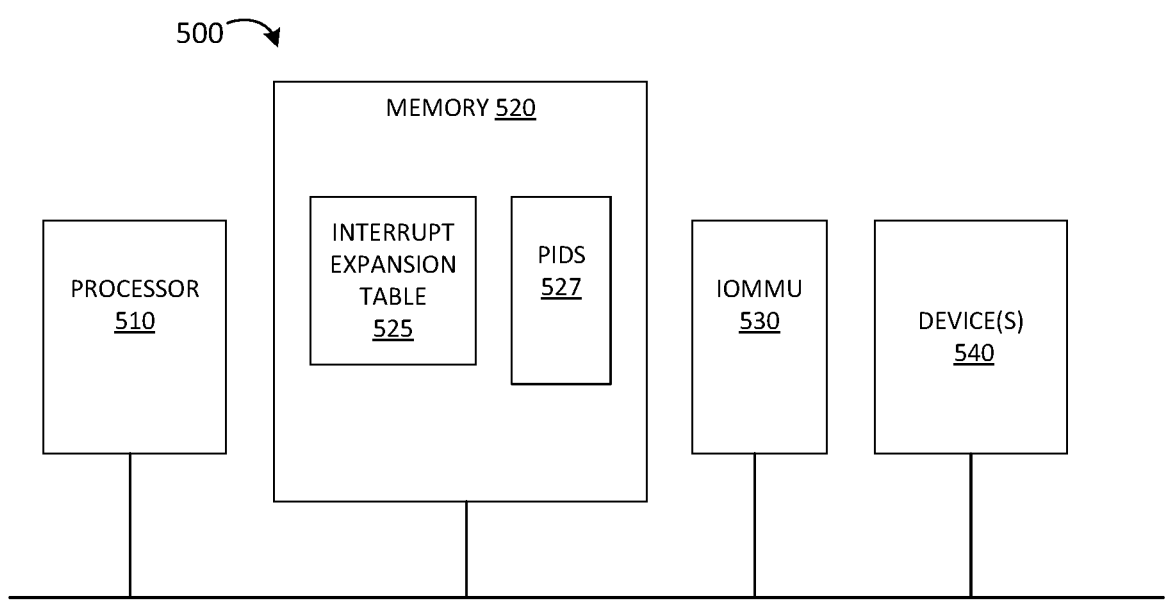
FIG. 4 is a block diagram of an example of a computer system according to an embodiment.

With reference to FIG. 4, an embodiment of a computer system 500 includes a processor 510 coupled to a memory 520 and an IOMMU 330. The processor 510 includes interrupt expansion features as described herein, and the memory 520 stores an interrupt expansion table 525 and PIDs 527 (e.g., which may include bitmaps). The memory 520 may correspond to system memory that may comprise one or more media on which information, such as data and/or program code, may be stored, such as static or dynamic random-access memory, semiconductor-based read-only or flash memory, magnetic or optical disk memory, or any other type of medium readable by the processor 510. The IOMMU 530 may configure interrupt sources for interrupt posting with the PIDs 527.

The system 500 may further include one or more devices 540 that may comprise any type of I/O device, peripheral device, or other device that may initiate an interrupt request, such as a keyboard, mouse, trackball, pointing device, monitor, printer, media card, network interface, information storage device, etc. The devices 540 may be embodied in discrete components or may be integrated with other devices. In certain implementations, a device 540 may represent a function in a multifunctional I/O, peripheral, or other device.

The processor 510, memory 520, devices 540, and other components (e.g., chipset(s), etc.) may be coupled to each other directly or indirectly through one or more parallel, sequential, pipelined, asynchronous, synchronous, wired, wireless, and/or other bus or point-to-point connection or means of communication. For example, processor 510 may include an interface to receive signals, messages, and/or transactions, such as interrupt requests, from the devices 540, or transmit signals, messages, and/or transactions to the devices 540 and/or any other agents or components in system 500, through any such connection or other means of communication. Similarly, the devices 540 may include respective interfaces to transmit and/or receive signals, messages, and/or transactions to the processor 510, and/or any other agents or components of the system 500. In certain implementations, the computer system 500 may also include various other components not shown in FIG. 4.

The processor 510 further includes logic, circuitry, and/or microcode to implement one or more features of the embodiments described herein. For example, when the processor 510 is to deliver an interrupt, the processor 510 consults an entry in the table 525 corresponding to the interrupt's vector. If the entry is not valid, the interrupt is delivered normally. If the entry is valid, the processor 510 instead reads a bitmap from the PIDs 527 referenced by the entry of the table 525. The processor 510 then delivers the interrupt to software, communicating information derived from the bitmap together with the interrupt.

Figure 5:
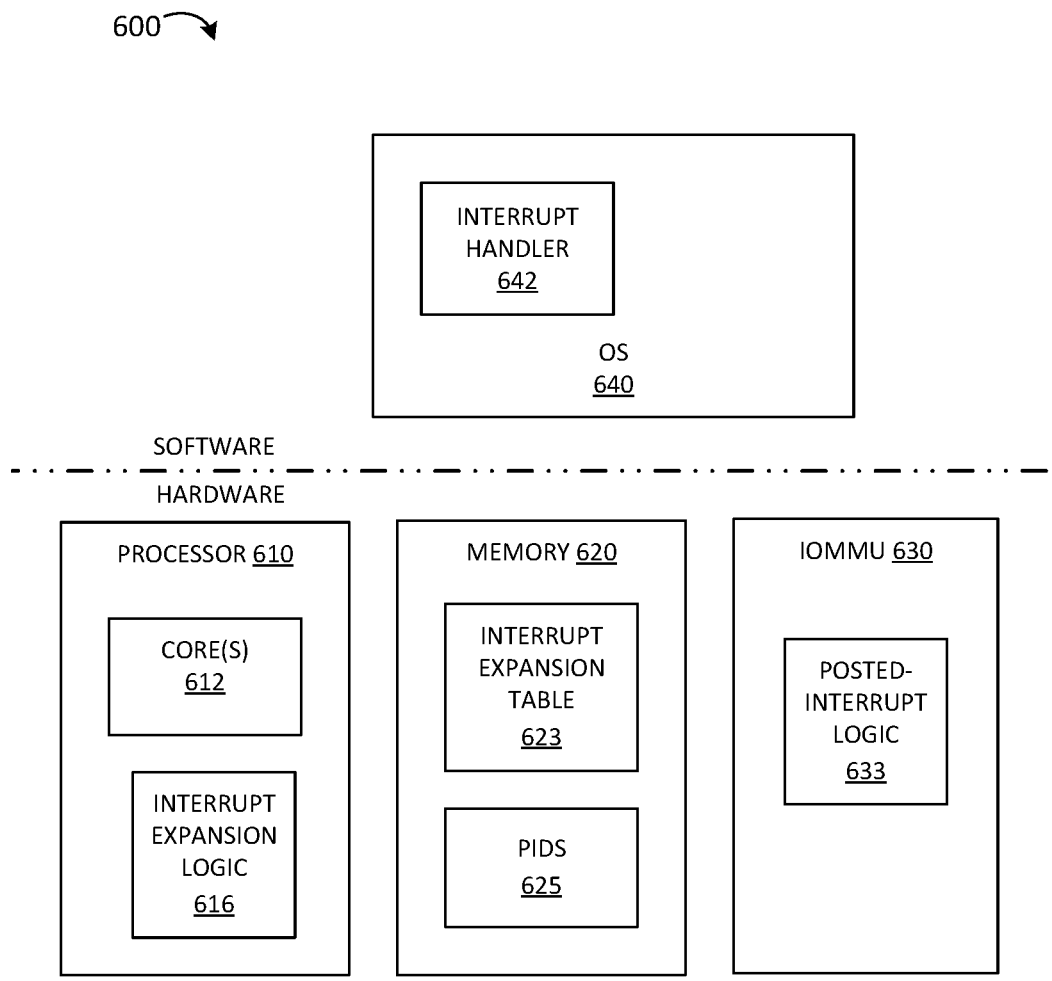
FIG. 5 is a block diagram of another example of a computer system according to an embodiment.
Figure 6A:
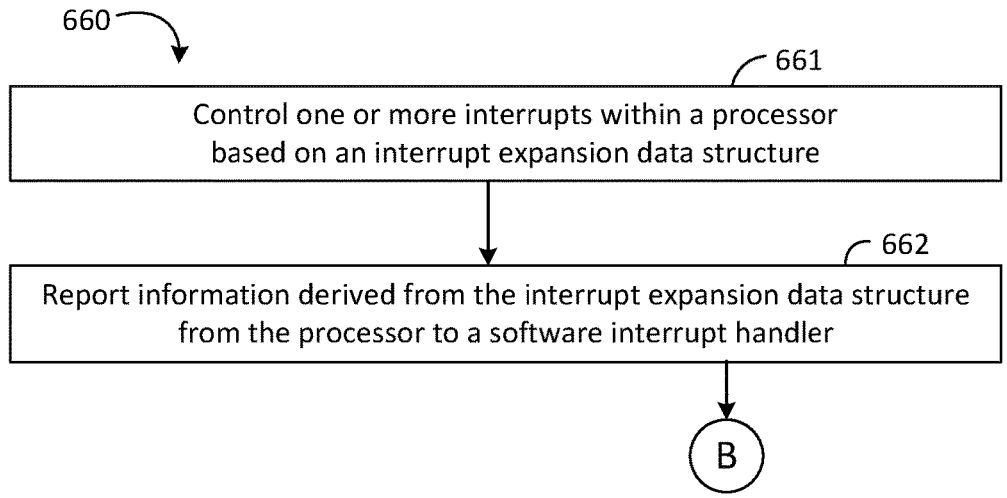
FIGS. 6A to 6D are flow diagrams of an example of a method according to an embodiment.
Figure 6B:
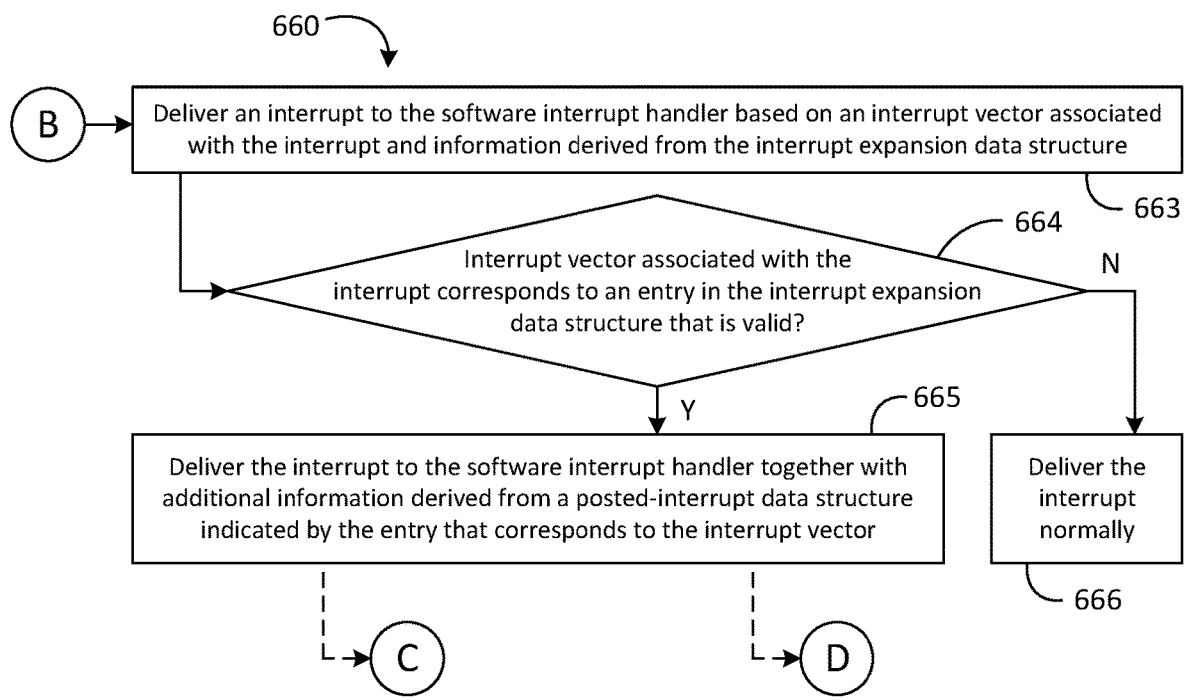
Figure 6C:
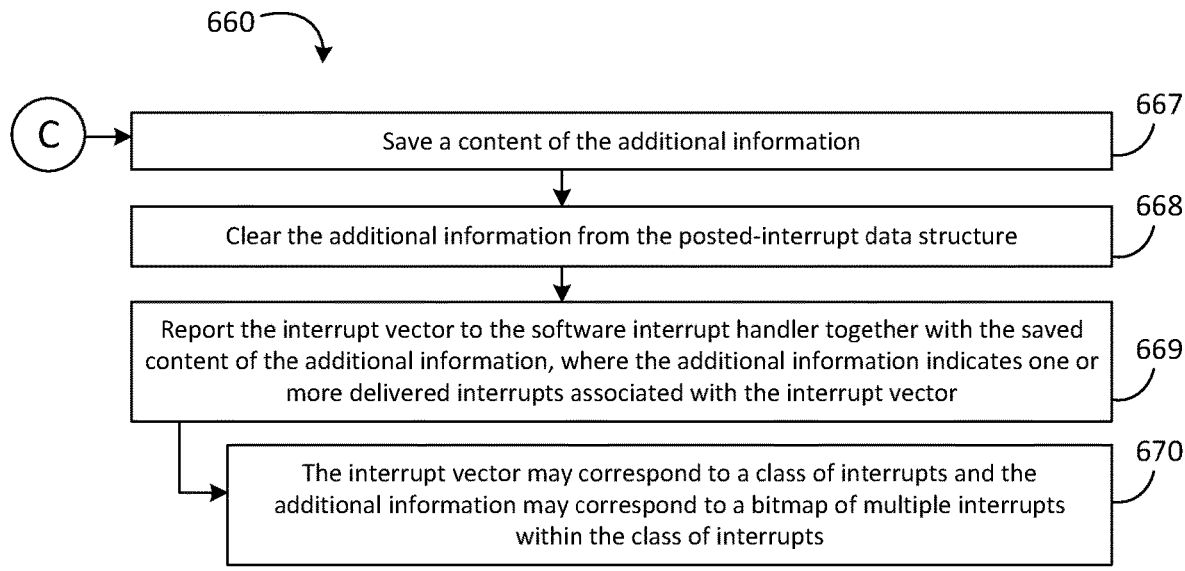
Figure 6D:
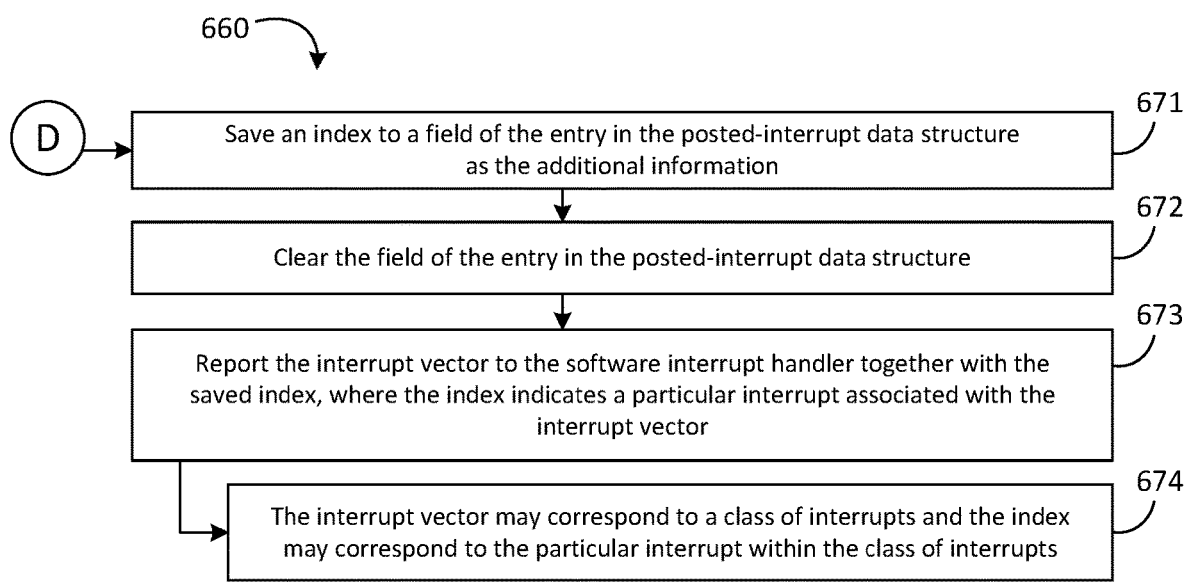

With reference to FIG. 5, an embodiment of a computer system 600 includes a processor 610, memory 620, and an IOMMU 630 (e.g., on a hardware side of the system 600), and an OS 640 (e.g., on a software side of the system 600) that support processor interrupt expansion technology. For example, the processor 610 includes one or more cores 612 and interrupt expansion logic 616 to implement one or more features of the embodiments described herein. The memory 620 stores an interrupt expansion data structure that includes an interrupt expansion table 623 and PIDs 625. The IOMMU 630 includes posted-interrupt logic 633 to configure interrupt sources for interrupt posting with the PIDs 625. The OS 640 includes a software interrupt handler 642. In some embodiments, the interrupt expansion logic 616 may be configured to control one or more interrupts based on the interrupt expansion table 623, and report information derived from the PID bitmaps 625 to the software interrupt handler 642. In some embodiments, the interrupt expansion logic 616 may be configured (e.g., with configurable logic, fixed-function logic, circuitry, microcode, etc.) to deliver an interrupt to the software interrupt handler 642 based on an interrupt vector associated with the interrupt and information derived from the interrupt expansion table 623. For example, the interrupt expansion logic 616 may be configured to determine if the interrupt vector associated with the interrupt corresponds to an entry in the interrupt expansion table 623 that is valid and, if so determined, to deliver the interrupt to the software interrupt handler 642 together with additional information derived from a bitmap of the PIDs 625 indicated by the entry of the table 623 that corresponds to the interrupt vector.

The interrupt expansion data structure(s) may take any suitable form and may be utilized by any suitable technique. In one embodiment of a suitable technique, referred to as an "all at once" technique, the processor 610 clears the bitmap in memory after reading the PID's bitmap. The processor 610 then delivers the interrupt, communicating the original contents of the bitmap to software (e.g., the OS 640, the interrupt handler 642, etc.). For example, the processor 610 may save the original bitmap content on a stack of the interrupt handler, in a processor register, in a fixed location in memory, etc.

With the "all at once" technique, the software interrupt handler 642 has access to at least two pieces of information including the interrupt vector and the bitmap. Depending on the processor's interrupt-delivery mechanism, the interrupt handler 642 may determine the interrupt vector either by reading data on the stack or implicitly based on the entry point to the interrupt handler. In this example, each interrupt vector may define a class of interrupts and the bitmap may indicate which interrupt(s) in that class are being delivered. When an interrupt delivery reports a bitmap, each bit in the bitmap indicates one interrupt in the class that is being delivered (e.g., more than one bit in the bitmap may be set).

In another embodiment of a suitable technique, referred to as a "one at a time" technique, after reading the PID's bitmap, the processor 610 writes the bitmap back, clearing one of the bits that was set that corresponds to an index of an interrupt (e.g., the most significant set bit of the bitmap). The processor 610 then delivers the interrupt, communicating the index of the bit that was cleared to software (e.g., the OS 640, the interrupt handler 642, etc.). The processor may save the index on the stack of the interrupt handler, in a processor register, in a fixed location in memory, etc.

With the "one at a time" technique, the software interrupt handler 642 has access to at least two pieces of information, including the interrupt vector and the index of the bit that was cleared. In this example, the interrupt vector may define a class of interrupts and the index indicates which interrupt in the class is being delivered.

For either of the "all at once" or "one at a time" techniques, an embodiment of a platform that supports 256 interrupt vectors and that utilizes UPIDs, each of which contains a 64-entry bitmap, advantageously allows an OS to distinguish $256*64=16,384=2^{14}$ different interrupt sources. The following example shows how the source of an interrupt delivered in accordance with an embodiment may be associated with a 14-bit number. An example interrupt source S may utilize an interrupt index I ($0 \leq I \leq 63$) and a UPID utilizing a notification interrupt with a vector V ($0 \leq V \leq 255$). The source S may be associated with a number N=(V«6)+I (e.g., the least significant 6 bits of the 14-bit number N contain the interrupt index value I while the most significant 8 bits contain the notification interrupt vector V).

With reference to FIGS. 6A to 6D, an embodiment of a method 660 may include controlling one or more interrupts within a processor based on an interrupt expansion data structure at box 661, and reporting information derived from the interrupt expansion data structure from the processor to a software interrupt handler at box 662. Some embodiments of the method 660 may further include delivering an interrupt to the software interrupt handler based on an interrupt vector associated with the interrupt and information derived from the interrupt expansion data structure at box 663. For example, the method 660 may include determining if the interrupt vector associated with the interrupt corresponds to an entry in the interrupt expansion data structure that is valid at box 664, and, if so determined, delivering the interrupt to the software interrupt handler together with additional information derived from a posted-interrupt data structure indicated by the entry that corresponds to the interrupt vector at box 665. Otherwise, the method 660 may proceed to delivering the interrupt normally at box 666.

Some embodiments of the method 660 may further include saving a content of the additional information at box 667, clearing the additional information from the posted-interrupt data structure at box 668, and reporting the interrupt vector to the software interrupt handler together with the saved content of the additional information, where the additional information indicates one or more delivered interrupts associated with the interrupt vector at box 669. For example, the interrupt vector may correspond to a class of interrupts and the additional information may correspond to a bitmap of multiple interrupts within the class of interrupts at box 670.

Some embodiments of the method 660 may alternatively include saving an index to a field of the entry in the posted-interrupt data structure as the additional information at box 671, clearing the field of the entry in the posted-interrupt data structure at box 672, and reporting the interrupt vector to the software interrupt handler together with the saved index, where the index indicates a particular interrupt associated with the interrupt vector at box 673. In this example, the interrupt vector may correspond to a class of interrupts and the index may correspond to the particular interrupt within the class of interrupts at box 674.

Embodiments of the method 660 may be performed by a core or processor such as those described herein including, for example, the core 990 (FIG. 8B), the cores 1102A-N (FIGS. 10, 14), the processor 1100 (FIG. 10), the processor 1210 (FIG. 11), the co-processor 1245 (FIG. 11), the processor 1370 (FIGS. 12-13), the processor/coprocessor 1380 (FIGS. 12-13), the coprocessor 1338 (FIGS. 12-13), the application processor 1510 (FIG. 14), the coprocessor 1520 (FIG. 14), and/or the processors 1614, 1616 (FIG. 15). For example, the method 660 may be performed by the execution of suitable microcode by the core/processor.

Figure 7:
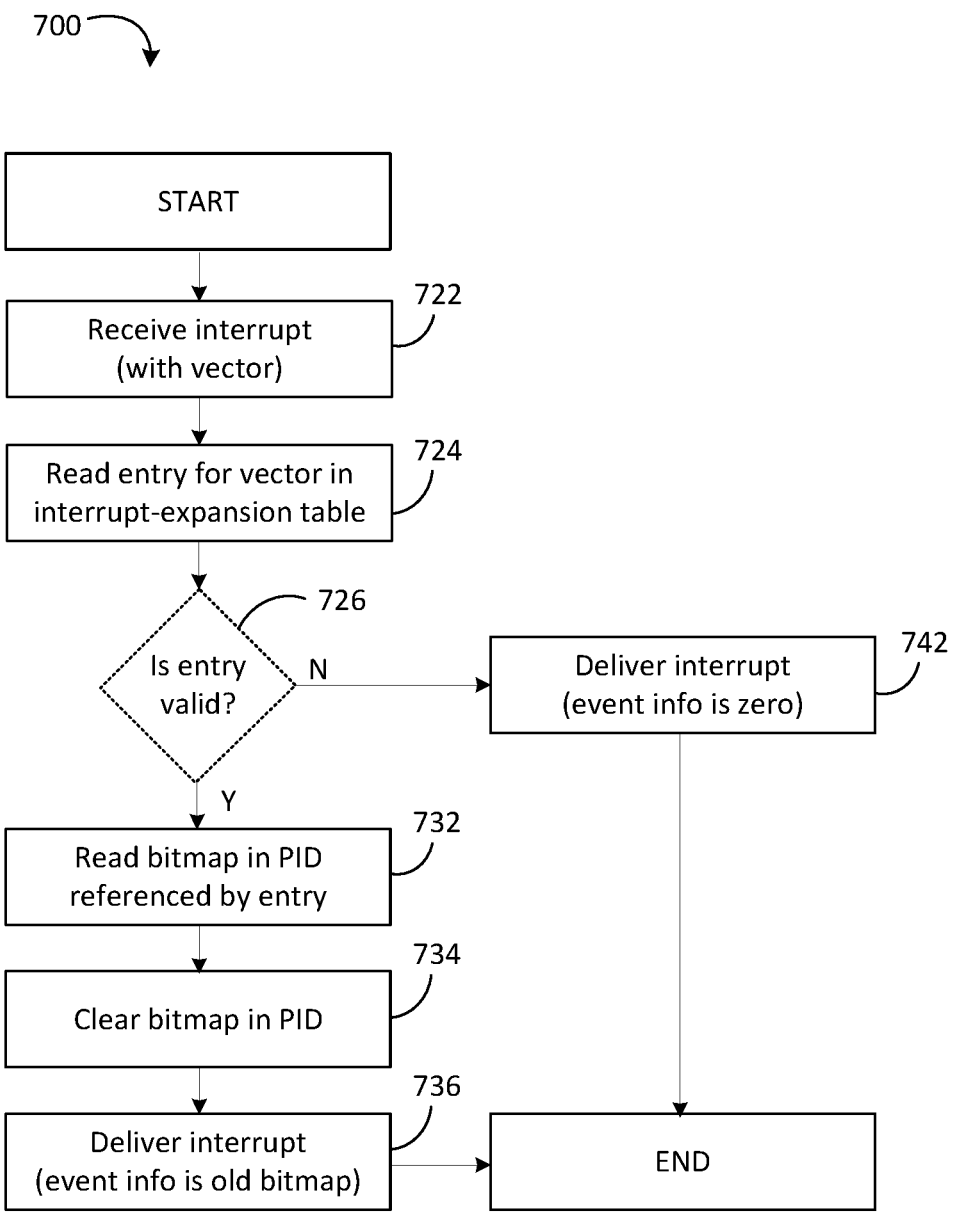
FIG. 7 is a flow diagram of another example of a method according to an embodiment.

With reference to FIG. 7, an embodiment of a method 700 illustrates an example flow of control using the "all at once" technique. In this example, an interrupt-expansion table (e.g., table 623) contains one entry per interrupt vector, with each entry containing a valid bit and the address of a PID (e.g., PID 625) with a 64-entry bitmap. Some embodiments may utilize Flexible Return and Delivery (FRED) technology to deliver interrupts. For example, an embodiment of FRED event delivery may save 64 bits of event information for each event delivered. In the example, the contents of a PID's bitmap are saved as event information by FRED event delivery of an interrupt. The method 700 includes receiving an interrupt at box 722 (e.g., with an interrupt vector associated with the interrupt), reading an entry for the interrupt vector in the interrupt-expansion-table at box 724, and determining if the entry is valid at box 726. If the entry in the table is valid at box 726, the method 700 may proceed to reading the bitmap in the PID referenced by the entry at box 732, clearing the bitmap in the PID at box 734, and delivering the interrupt at box 736 (e.g., where the event information is the old bitmap). If the entry in the table is not valid at box 726, the method 700 may proceed to delivering the interrupt at box 742 (e.g., where the event information is zero).

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 8B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

FIG. 10 is a block diagram of a processor 1100 that may have more than one core, may have an integrated memory controller, and may have integrated graphics according to embodiments of the invention. The solid lined boxes in FIG. 10 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
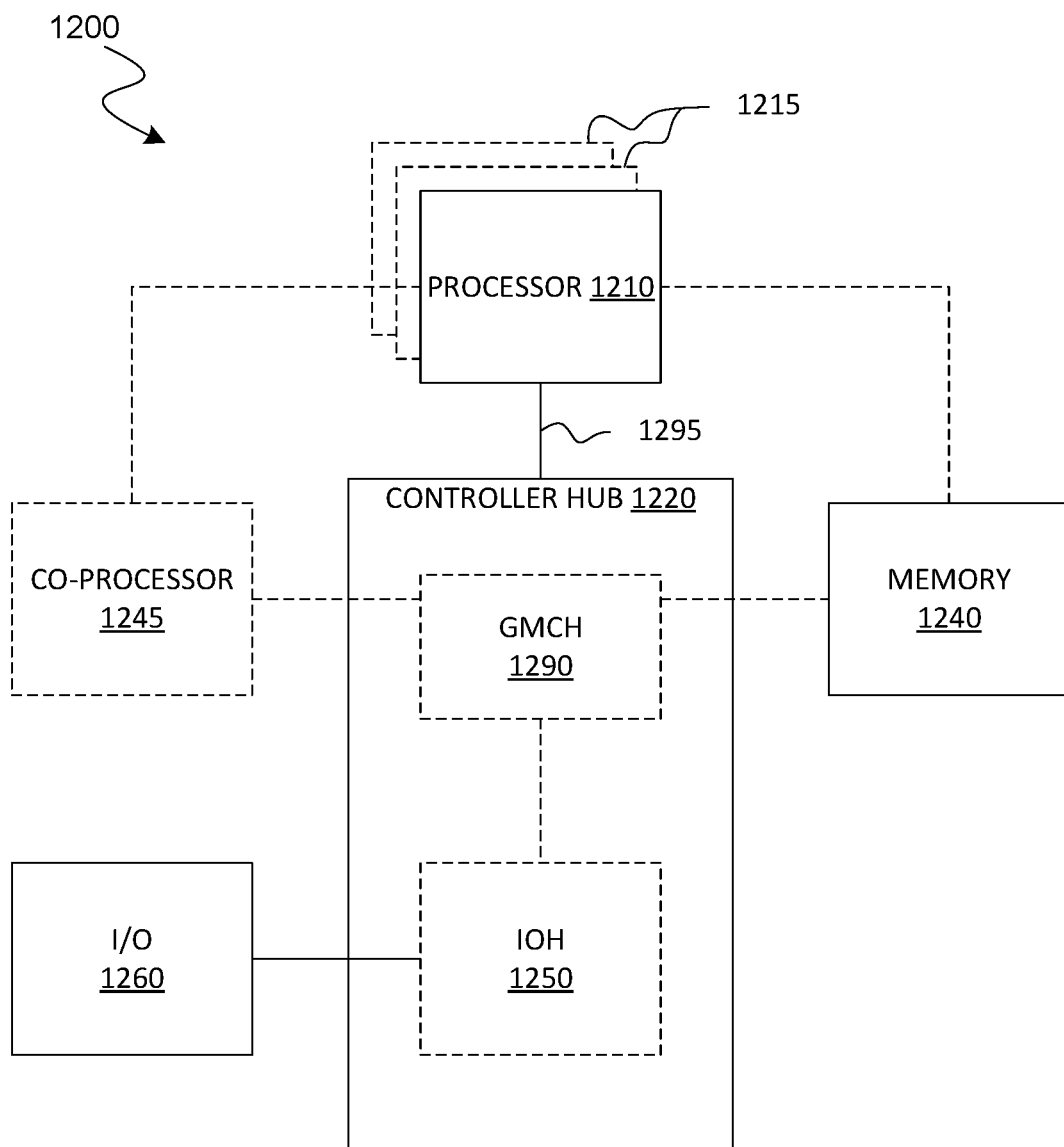
FIGS. 11-14 are block diagrams of exemplary computer architectures.

Referring now to FIG. 11, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 11 with broken lines. Each processor 1210, 1215 may include one or more of the processing cores described herein and may be some version of the processor 1100.

The memory 1240 may be, for example, dynamic random-access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 12:
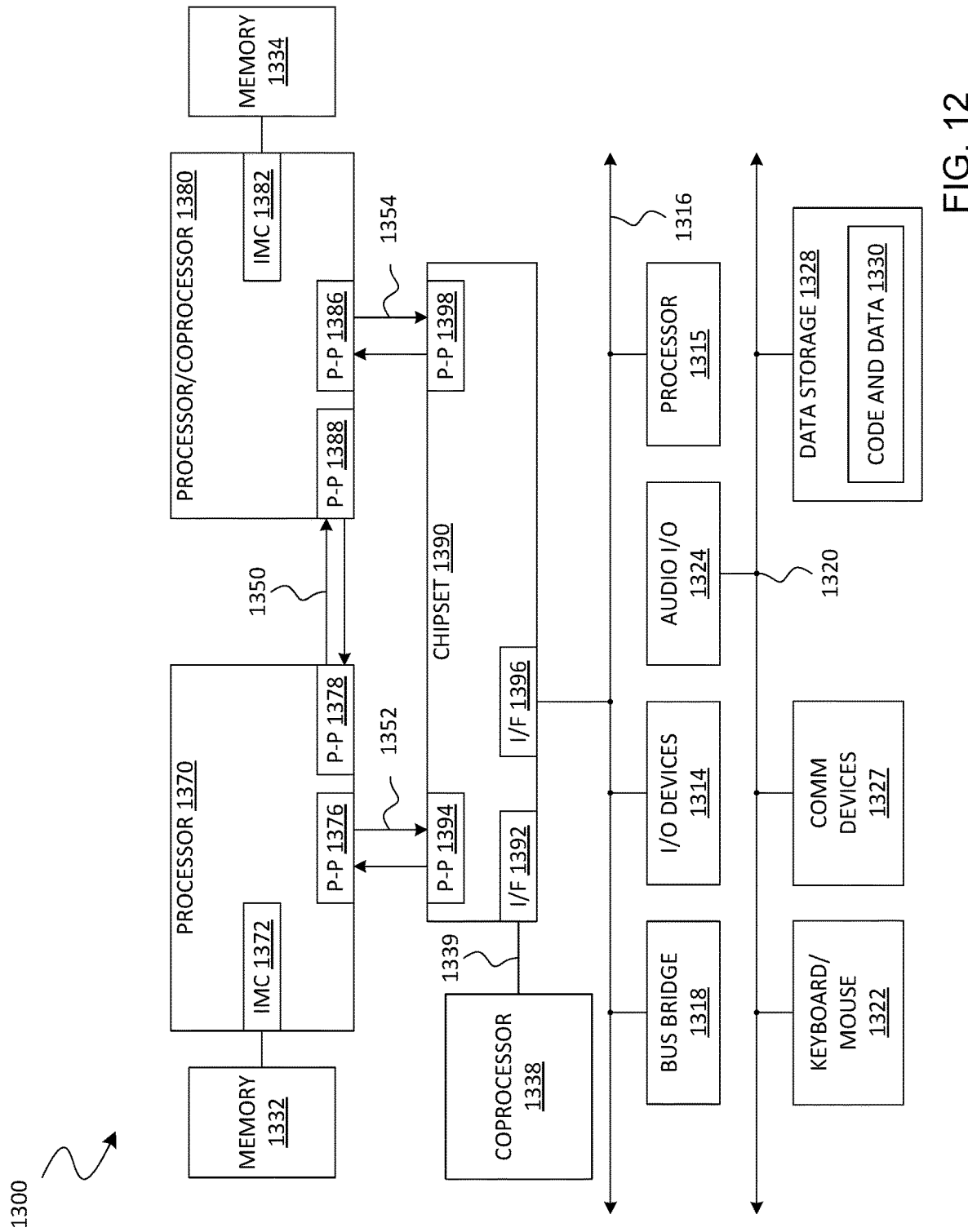

Referring now to FIG. 12, shown is a block diagram of a first more specific exemplary system 1300 in accordance with an embodiment of the present invention. As shown in FIG. 12, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 12, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 12, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 12, a system may implement a multi-drop bus or other such architecture.

Referring now to FIG. 13, shown is a block diagram of a second more specific exemplary system 1400 in accordance with an embodiment of the present invention Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1370, 1380 may include integrated memory and I/O control logic ("CL") 1472 and 1482, respectively. Thus, the CL 1472, 1482 include integrated memory controller units and include I/O control logic. FIG. 13 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Referring now to FIG. 14, shown is a block diagram of a SoC 1500 in accordance with an embodiment of the present invention. Similar elements in FIG. 10 bear like reference numerals. Also, dashed lined boxes are optional features on more advanced SoCs. In FIG. 14, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random-access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random-access memories (RAMs) such as dynamic random-access memories (DRAMs), static random-access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 15 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Techniques and architectures for a processor or core with interrupt expansion features are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

ADDITIONAL NOTES AND EXAMPLES

Example 1 includes an integrated circuit, comprising a processor with one or more cores and circuitry coupled to the one or more cores, the circuitry to control one or more interrupts based on an interrupt expansion data structure, and report information derived from the interrupt expansion data structure to a software interrupt handler.

Example 2 includes the integrated circuit of Example 1, wherein the circuitry is further to deliver an interrupt to the software interrupt handler based on an interrupt vector associated with the interrupt and information derived from the interrupt expansion data structure.

Example 3 includes the integrated circuit of Example 2, wherein the circuitry is further to determine if the interrupt vector associated with the interrupt corresponds to an entry in the interrupt expansion data structure that is valid, and, if so determined, deliver the interrupt to the software interrupt handler together with additional information derived from a posted-interrupt data structure indicated by the entry that corresponds to the interrupt vector.

Example 4 includes the integrated circuit of Example 3, wherein the circuitry is further to save a content of the additional information, clear the additional information from the posted-interrupt data structure, and report the interrupt vector to the software interrupt handler together with the saved content of the additional information, wherein the additional information indicates one or more delivered interrupts associated with the interrupt vector.

Example 5 includes the integrated circuit of Example 4, wherein the interrupt vector corresponds to a class of interrupts and the additional information corresponds to a bitmap of multiple interrupts within the class of interrupts.

Example 6 includes the integrated circuit of any of Examples 3 to 5, wherein the circuitry is further to save an index to a field of the entry in the posted-interrupt data structure as the additional information, clear the field of the entry in the posted-interrupt data structure, and report the interrupt vector to the software interrupt handler together with the saved index, wherein the index indicates a particular interrupt associated with the interrupt vector.

Example 7 includes the integrated circuit of Example 6, wherein the interrupt vector corresponds to a class of interrupts and the index corresponds to the particular interrupt within the class of interrupts.

Example 8 includes a method, comprising controlling one or more interrupts within a processor based on an interrupt expansion data structure, and reporting information derived from the interrupt expansion data structure from the processor to a software interrupt handler.

Example 9 includes the method of Example 8, further comprising delivering an interrupt to the software interrupt handler based on an interrupt vector associated with the interrupt and information derived from the interrupt expansion data structure.

Example 10 includes the method of Example 9, further comprising determining if the interrupt vector associated with the interrupt corresponds to an entry in the interrupt expansion data structure that is valid, and, if so determined, delivering the interrupt to the software interrupt handler together with additional information derived from a posted-interrupt data structure indicated by the entry that corresponds to the interrupt vector.

Example 11 includes the method of Example 10, further comprising saving a content of the additional information, clearing the additional information from the posted-interrupt data structure, and reporting the interrupt vector to the software interrupt handler together with the saved content of the additional information, wherein the additional information indicates one or more delivered interrupts associated with the interrupt vector.

Example 12 includes the method of Example 11, wherein the interrupt vector corresponds to a class of interrupts and the additional information corresponds to a bitmap of multiple interrupts within the class of interrupts.

Example 13 includes the method of any of Examples 10 to 12, further comprising saving an index to a field of the entry in the posted-interrupt data structure as the additional information, clearing the field of the entry in the posted-interrupt data structure, and reporting the interrupt vector to the software interrupt handler together with the saved index, wherein the index indicates a particular interrupt associated with the interrupt vector.

Example 14 includes the method of Example 13, wherein the interrupt vector corresponds to a class of interrupts and the index corresponds to the particular interrupt within the class of interrupts.

Example 15 includes an apparatus, comprising memory to store an interrupt expansion data structure, and a processor coupled to the memory, the processor including one or more cores and circuitry coupled to the one or more cores to control one or more interrupts based on the interrupt expansion data structure, and report information derived from the interrupt expansion data structure to a software interrupt handler.

Example 16 includes the apparatus of Example 15, wherein the circuitry is further to deliver an interrupt to the software interrupt handler based on an interrupt vector associated with the interrupt and information derived from the interrupt expansion data structure.

Example 17 includes the apparatus of Example 16, wherein the circuitry is further to determine if the interrupt vector associated with the interrupt corresponds to an entry in the interrupt expansion data structure that is valid, and, if so determined, deliver the interrupt to the software interrupt handler together with additional information derived from a posted-interrupt data structure indicated by the entry that corresponds to the interrupt vector.

Example 18 includes the apparatus of Example 17, wherein the circuitry is further to save a content of the additional information, clear the additional information from the posted-interrupt data structure, and report the interrupt vector to the software interrupt handler together with the saved content of the additional information, wherein the additional information indicates one or more delivered interrupts associated with the interrupt vector.

Example 19 includes the apparatus of Example 18, wherein the interrupt vector corresponds to a class of interrupts and the additional information corresponds to a bitmap of multiple interrupts within the class of interrupts.

Example 20 includes the apparatus of any of Examples 17 to 19, wherein the circuitry is further to save an index to a field of the entry in the posted-interrupt data structure as the additional information, clear the field of the entry in the posted-interrupt data structure, and report the interrupt vector to the software interrupt handler together with the saved index, wherein the index indicates a particular interrupt associated with the interrupt vector.

Example 21 includes the apparatus of Example 20, wherein the interrupt vector corresponds to a class of interrupts and the index corresponds to the particular interrupt within the class of interrupts.

Example 22 includes an apparatus, comprising means for controlling one or more interrupts within a processor based on an interrupt expansion data structure, and means for reporting information derived from the interrupt expansion data structure from the processor to a software interrupt handler.

Example 23 includes the apparatus of Example 22, further comprising means for delivering an interrupt to the software interrupt handler based on an interrupt vector associated with the interrupt and information derived from the interrupt expansion data structure.

Example 24 includes the apparatus of Example 23, further comprising means for determining if the interrupt vector associated with the interrupt corresponds to an entry in the interrupt expansion data structure that is valid, and, if so determined, means for delivering the interrupt to the software interrupt handler together with additional information derived from a posted-interrupt data structure indicated by the entry that corresponds to the interrupt vector.

Example 25 includes the apparatus of Example 24, further comprising means for saving a content of the additional information, means for clearing the additional information from the interrupt expansion data structure, and means for reporting the interrupt vector to the software interrupt handler together with the saved content of the additional information, wherein the additional information indicates one or more delivered interrupts associated with the interrupt vector.

Example 26 includes the apparatus of Example 25, wherein the interrupt vector corresponds to a class of interrupts and the additional information corresponds to a bitmap of multiple interrupts within the class of interrupts.

Example 27 includes the apparatus of any of Examples 24 to 26, further comprising means for saving an index to a field of the entry in the posted-interrupt data structure as the additional information, means for clearing the field of the entry in the posted-interrupt data structure, and means for reporting the interrupt vector to the software interrupt handler together with the saved index, wherein the index indicates a particular interrupt associated with the interrupt vector.

Example 28 includes the apparatus of Example 27, wherein the interrupt vector corresponds to a class of interrupts and the index corresponds to the particular interrupt within the class of interrupts.

Example 29 includes at least one non-transitory machine readable medium comprising a plurality of instructions that, in response to being executed on a computing device, cause the computing device to control one or more interrupts within a processor based on an interrupt expansion data structure, and report information derived from the posted-interrupt data structure from the processor to a software interrupt handler.

Example 30 includes the at least one non-transitory machine readable medium of Example 29, comprising a plurality of further instructions that, in response to being executed on the computing device, and in response to the single request, cause the computing device to deliver an interrupt to the software interrupt handler based on an interrupt vector associated with the interrupt and information derived from the interrupt expansion data structure.

Example 31 includes the at least one non-transitory machine readable medium of Example 30, comprising a plurality of further instructions that, in response to being executed on the computing device, and in response to the single request, cause the computing device to determine if the interrupt vector associated with the interrupt corresponds to an entry in the interrupt expansion data structure that is valid, and, if so determined, deliver the interrupt to the software interrupt handler together with additional information derived from a posted-interrupt data structure indicated by the entry that corresponds to the interrupt vector.

Example 32 includes the at least one non-transitory machine readable medium of Example 31, comprising a plurality of further instructions that, in response to being executed on the computing device, and in response to the single request, cause the computing device to save a content of the additional information, clear the additional information from the posted-interrupt data structure, and report the interrupt vector to the software interrupt handler together with the saved content of the additional information, wherein the additional information indicates one or more delivered interrupts associated with the interrupt vector.

Example 33 includes the at least one non-transitory machine readable medium of Example 32, wherein the interrupt vector corresponds to a class of interrupts and the additional information corresponds to a bitmap of multiple interrupts within the class of interrupts.

Example 34 includes the at least one non-transitory machine readable medium of any of Examples 31 to 33, comprising a plurality of further instructions that, in response to being executed on the computing device, and in response to the single request, cause the computing device to save an index to a field of the entry in the posted-interrupt data structure as the additional information, clear the field of the entry in the posted-interrupt data structure, and report the interrupt vector to the software interrupt handler together with the saved index, wherein the index indicates a particular interrupt associated with the interrupt vector.

Example 35 includes the at least one non-transitory machine readable medium of Example 34, wherein the interrupt vector corresponds to a class of interrupts and the index corresponds to the particular interrupt within the class of interrupts.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random-access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit, comprising:
 a processor to be coupled to a memory, the processor comprising one or more cores and circuitry coupled to the one or more cores, the circuitry to:
  receive a hardware interrupt comprising:
   a first vector which is to indicate a class or interrupts; and
   a first index which is to identify a bit location; and
  based on the hardware interrupt:
   access the memory, based on the first vector, to identify a first entry of one or more tables which are to comprise multiple entries which are each indexed based on a different respective vector, and which each indicate a respective one of multiple posted-interrupt data structures (PIDs) at the memory, wherein the multiple PIDs are each to comprise:
    a respective bitmap comprising bits which each correspond to a different respective one of multiple interrupt sources; and
    an identifier of a respective target processor of multiple processors;
   identify a first posted-interrupt data structure (PID) of the multiple PIDs based on the first entry, wherein the first PID comprises a first bitmap, and wherein the first PID identifies a first target processor;
   access a bit of the first bitmap based on the first index;
   deliver an interrupt to a software interrupt handler; and
   provide event information to the first target processor based on the bit of the first bitmap.

2. The integrated circuit of claim 1, wherein a field of the first entry is to identify one of multiple available interrupt types comprising a virtual interrupt type and a user interrupt type.

3. The integrated circuit of claim 1, wherein:
 a field of the first entry is to identify a validity of the first entry; and
 the circuitry is to access the bit of the first bitmap based on the validity.

4. The integrated circuit of claim 1, wherein:
based on the hardware interrupt, the circuitry is to:
  save a content of the first bitmap; and
  clear the first bitmap; and
the event information indicates one or more delivered interrupts associated with the first vector.

5. The integrated circuit of claim 1, wherein:
based on the hardware interrupt, the circuitry is to:
  save the first index as the event information; and
  selectively clear only the bit of the first bitmap.

6. A method at a processor, the method comprising:
receiving a hardware interrupt comprising:
  a first vector which indicates a class or interrupts; and
  a first index which identifies a bit location; and
based on the hardware interrupt:
  accessing a memory coupled to the processor, based on the first vector, to identify a first entry of one or more tables comprising multiple entries which are each indexed based on a different respective vector, and which each indicate a respective one of multiple posted-interrupt data structures (PIDs) at the memory, wherein the multiple PIDs each comprise:
    a respective bitmap comprising bits which each correspond to a different respective one of multiple interrupt sources; and
    an identifier of a respective target processor of multiple processors;
  identifying a first posted-interrupt data structure (PID) of the multiple PIDs based on the first entry, wherein the first PID comprises a first bitmap, and wherein the first PID identifies a first target processor;
  accessing a bit of the first bitmap based on the first index;
  delivering an interrupt to a software interrupt handler; and
  providing event information to the first target processor based on the bit of the first bitmap.

7. The method of claim 6, wherein a field of the first entry identifies one of multiple available interrupt types comprising a virtual interrupt type and a user interrupt type.

8. The method of claim 7, wherein:
a field of the first entry identifies a validity of the first entry; and
the bit of the first bitmap is accessed based on the validity.

9. The method of claim 8, wherein:
the method further comprises:
  saving a content of the first bitmap; and
  clearing the first bitmap; and
the event information indicates one or more delivered interrupts associated with the first vector.

10. The method of claim 8, further comprising:
based on the hardware interrupt:
  saving the first index as the event information; and
  selectively clearing only the bit of the first bitmap.

11. An apparatus, comprising:
memory to store:
  multiple posted-interrupt data structures (PIDs) which are each to comprise:
    a respective bitmap comprising bits which each correspond to a different respective one of multiple interrupt sources; and
    an identifier of a respective target processor of multiple processors; and
  one or more tables comprising multiple entries which are each indexed based on a different respective vector, and which each indicate a respective one of the multiple PIDs; and
a processor coupled to the memory, the processor including one or more cores and circuitry coupled to the one or more cores to:
  receive a hardware interrupt comprising:
    a first vector which is to indicate a class or interrupts; and
    a first index which is to identify a bit location; and
  based on the hardware interrupt:
    access the memory, based on the first vector, to identify a first entry of the one or more tables;
    identify a first posted-interrupt data structure (PID) of the multiple PIDs based on the first entry, wherein the first PID comprises a first bitmap, and wherein the first PID identifies a first target processor;
    access a bit of the first bitmap based on the first index;
    deliver an interrupt to a software interrupt handler; and
    provide event information to the first target processor based on the bit of the first bitmap.

12. The apparatus of claim 11, wherein a field of the first entry is to identify one of multiple available interrupt types comprising a virtual interrupt type and a user interrupt type.

13. The apparatus of claim 11, wherein:
a field of the first entry is to identify a validity of the first entry; and
the circuitry is to access the bit of the first bitmap based on the validity.

14. The apparatus of claim 11, wherein:
based on the hardware interrupt, the circuitry is to:
  save a content of the first bitmap; and
  clear the first bitmap; and
the event information indicates one or more delivered interrupts associated with the first vector.

15. The apparatus of claim 11, wherein:
based on the hardware interrupt, the circuitry is to:
  save the first index as the event information; and
  selectively clear only the bit of the first bitmap.

* * * * *